United States Patent [19]

Thor

[11] Patent Number: 5,448,564
[45] Date of Patent: Sep. 5, 1995

[54] MODULAR ARCHITECTURE FOR FAST-PACKET NETWORK

[75] Inventor: Allen Thor, Livingston, N.J.

[73] Assignee: Advanced Micro Devices, Inc., Sunnyvale, Calif.

[21] Appl. No.: 188,873

[22] Filed: Jan. 31, 1994

[51] Int. Cl.[6] ............................................. H04J 3/24
[52] U.S. Cl. .................................. 370/94.1; 370/60
[58] Field of Search ................ 370/94.1, 60, 15, 85.1,
370/85.2, 85.5, 95.1, 95.2, 95.3, 58.1, 85.3, 85.4,
60.1

[56] References Cited

U.S. PATENT DOCUMENTS

| | | | |
|---|---|---|---|
| 4,712,214 | 12/1987 | Meltzer et al. | 370/60 |
| 4,918,687 | 4/1990 | Bustini et al. | 370/60.1 |
| 5,136,584 | 8/1992 | Hedlund | 370/94.1 |
| 5,189,672 | 2/1993 | Le Bihan | 370/60 |
| 5,305,317 | 4/1994 | Szczepanek | 370/85.2 |
| 5,311,509 | 5/1994 | Heddes et al. | 370/94.1 |
| 5,311,513 | 5/1994 | Ahmadi et al. | 370/85.4 |

Primary Examiner—Douglas W. Olms
Assistant Examiner—Shick Hom
Attorney, Agent, or Firm—Lowe, Price, LeBlanc & Becker

[57] ABSTRACT

A modular architecture for fast-packet networks that comprises line interface devices (LIDs) exchangeable to support numerous line interfaces. The LIDs supply frame relay packet management devices (FRYPAMs) with unified framed data in high-level data-link control (HDLC) format and clock signals. The receiving FRYPAMs perform cyclic redundancy check (CRC) checking, check look-up tables to convert the data link connection identifier (DLCI) fields if needed, write the received frames with correct frame check sequence (FCS) fields into a frame buffer RAM and communicate with other FRYPAMs to update transmission queues. The transmitting FRYPAMs read the frames from the frame buffer RAM and send them to the transmitting LIDs coupled to destination end points. The transmitting LIDs convert the HDLC data from the FRYPAMs to the format appropriate for the specific line interface and transmit the information to the destination end points. A frame buffer manager allocates available frame buffers in the frame buffer RAM among the FRYPAMs. A control and maintenance processor handles control and maintenance operations for the fast-packet network. It updates the look-up tables and communicates DLCI and line interface parameters to the LIDs in real time.

27 Claims, 9 Drawing Sheets

MODULAR ARCHITECTURE FOR FAST-PACKET NETWORK

TECHNICAL FIELD

This invention relates generally to data packet switching and more particularly, to a modular switching architecture for frame relay and cell relay networks.

BACKGROUND ART

The basic concepts of fast-packet networks are found in intelligent end-user systems, reliable digital transmission facilities, and high-speed communication systems. The growth in computer applications which require high speed communications, the proliferation of intelligent personal computers and work stations, and the growing availability of error-free high-speed transmission lines have combined to create a need for a new form of wide area network switching. This new switching technology requires high-speed, low delay, port sharing and band width sharing on a virtual circuit basis. TDM circuit switching provides the first two characteristics, and X.25 packet switching provides the last two. Fast-packet technology was developed as a new form of "packet mode" switching to provide all four characteristics, which together make fast-packet network an ideal solution for the bursty traffic sources found in LAN-WAN inter-networking.

Fast-packet technology offers users the ability to improve performance (response time) and reduce transmission costs dramatically for a number of important types of network applications. In order to be effective, fast-packet networks require that three conditions be met: (1) the end devices must be running an intelligent higher-layer protocol; (2) the transmission lines must be virtually error-free; and (3) the application must tolerate variable delay.

Other wide area network switching technologies, such as X.25 packet switching and TDM circuit switching, will remain important where line quality is not as good, when the network itself must guarantee error-free delivery or when the traffic (e.g., video or voice) is intolerant of delay.

A fast-packet network provides a "packet mode" service which uses statistical multiplexing and port sharing characteristics. However, unlike X.25, the fast-packet network completely eliminates all processing at Layer 3. Furthermore, it uses only a portion of the functions of Layer 2, the so-called "core aspects," which include checking for a valid error-free frame but not requesting retransmission if an error is found. Thus, protocol functions such as sequence number, window rotation, acknowledgements and supervisory packets are not performed within the fast-packet network. The result of stripping so many functions out of fast-packet network is that through-put (i.e., the number of frames that can be processed per second for a given cost of hardware) can be dramatically increased, since each packet requires much less processing. For the same reason, the delay through a fast-packet network is lower than that of X.25 although it remains higher than a TDM network which does no processing at all.

In order to be able to remove so many functions from the fast-packet network, the end devices must take the responsibility for assuring the error-free end-to-end transmission of data. The fact is that more and more of the end devices, particularly those attached to LANs, have the intelligence and processing power to perform that function.

Frame relay and cell relay are the two divisions of fast-packet technologies. Frame relay uses a framing structure which has variable lengths ranging from just a few characters to well over a thousand. This feature, which it shares with X.25, is very important in making frame relay operate well with LANs and other sources of synchronous data traffic, which require variable frame sizes. It also means that the delays encountered by the traffic (although always lower than X.25) will vary depending upon the sizes of the frames being sent. Some types of traffic are intolerant of delay, particularly delay which is variable. Voice is one example and video is another. For that reason, frame relay is not well suited to carrying such delay-sensitive traffic. On the other hand, it is very well matched to the requirements of bursty data sources such as LAN-to-LAN traffic.

When compared to X.25 packet, frame relay makes a small change to the frame structure by adding to the header at the beginning of the frame. The frame relay header contains the Data Link Connection Identifier (DLCI), which is the frame relay virtual circuit number corresponding with a particular destination. In the case of LAN-WAN inter-networking, the DLCI would denote the port to which the destination LAN is attached. The DLCI allows data coming into a frame relay network node to be sent across the network using a 3-step process:

1. Check the integrity of the frame using the Frame Check Sequence (FCS) and if it indicates an error, discard the frame.

2. Look at the DLCI in a table, and if the DLCI is not defined for this link, discard the frame.

3. Relay the frame toward its destination by sending it out the port or trunk specified in the table.

The two principal reasons frame relay data might be discarded are the detection of errors in the frame and the occurrence of congestion (the network is overloaded). The discard of frames does not interfere with the integrity of communications because of the intelligence in the end point devices such as PCs, work stations and hosts. These intelligent devices are operating with multi-level protocols which can detect and recover from loss of data in the network. The upper layer protocol in the end devices keeps track of the sequence numbers of the various frames sent and received. Acknowledgements are sent to inform the sending end which frame numbers have been successfully received. If a sequence number is missing, the receiving end will request a retransmittal. In this manner, the end devices assure that all of the frames eventually are received without errors.

FIG. 1 is a field diagram of the frame relay high-level data-link control (HDLC) format, comprising a flag area used for delimiting frames, followed by the DLCI area representing the addressing mechanism of frame relay. The DLCI consists of the six most significant bits of the second octet plus the four most significant bits of the third octet of the frame-relay frame. The DLCI bits of the second octet are followed by the Command/Response (C/R) indication bit. Additional bits, dependent upon the value of the extended address (EA) bit may be used to extend the DLCI beyond 10 bits to form a complete DLCI. The two-octet version of the DLCI shown in FIG. 1 covers 1024 addresses. In present implementations of frame relay, there are several restrictions placed on the assignment of DLCI values per ANSI specification. DLCI 0 is reserved for in channel call control signalling. DLCIs 1 through 15 and 1008 through 1022 are reserved for future use, and DLCI 1023 is reserved for Local Management Interface (LMI) communications. This leaves the 992 DLCIs from 16 through 1007 available for user data. DLCIs 16-991 are assigned to logical connections and DLCIs 992-1007 are used for Layer 2 management.

The DLCI area is followed by the Forward Explicit Congestion Notification (FECN) and Backward Explicit Congestion Notification (BECN) bits. The FECN bit indicates that congestion avoidance procedures should be started in the direction of the frame (Source→Network→End point). This bit may be used by the receiving end point to adjust the rate of the destination-controlled transmitter. The end point should slow down transmission of messages resulting in responses/acknowledgements.

The BECN bit indicates that congestion avoidance procedures should be started in the opposite direction of the frame (End point→Network→Source). This bit may be used by the receiving end point to adjust the rate of the source-controlled transmitters. The source should slow down all transmissions to the network.

The Discard Eligibility (DE) bit is used to indicate a frame's suitability for discard in network congestion situations. The indicated frames should be discarded in preference to other frames during congestion.

The information field of variable length carry user control data and information that are not interpreted by frame relay.

The two-octet Frame Check Sequence (FCS) field following the information field is used to verify that a frame is not corrupted during transmission. The FCS is the result of applying the Cyclic Redundancy Checking (CRC) polynomial to the frame from the first bit of the address field to the last bit of the information field. The FCS is calculated by the source device and recalculated by the destination device. If the two FCSs do not match, then the frame is discarded. The FCS is followed by a closing flag.

Cell relay is another division of fast-packet technologies. Like frame relay, cell relay requires intelligent end systems, reliable digital transmission facilities, and high-bandwidth capacities. The major difference between frame relay and cell relay is the units of information transferred. While frame relay transfers information in variable length "frames", cell relay transfers information in fixed length "cells".

The frame relay protocol is defined in standards listed in Table 1. Cell relay is defined in the ATM and 802.6 DQDB standards.

TABLE 1

| Organization | Standard | Description |
| --- | --- | --- |
| ANSI | T1.606-1990 | Integrated Services Digital Network (ISDN) - Frame Relaying Bearer Service - Architectural Framework and Service Description for Frame Relaying Bearer Service |
| ANSI | T1S1/90-175R4 | Addendum to T1.606 |
| ANSI | T1S1/88-2242 | Frame Relay Bearer Service - Architectural Framework and Service Description |
| ANSI | T1S1/90-214 (T1.6ca) | DSS1 - Core Aspects of Frame Protocol for Use with Frame Relay Bearer Service |
| ANSI | T1S1/90-213 (T1.6fr) | DSS1 - Signalling Specification for Frame Relay Bearer Service |
| CCITT | I.122 | Framework for Providing Additional Packet Mode Bearer Services |
| CCITT | I.431 | Primary (1544,2048 Kbps) ISDN interface |
| CCITT | Q.922 | ISDN Data Link Layer Specification for Frame Mode Bearer Service |
| CCITT | Q.931 | ISDN Network Protocol |
| CCITT | Q.933 | ISDN Signalling Specification for Frame Mode Bearer Services |

Table 1. Frame relay and related standards

Currently, the frame relay and cell relay protocols are performed in software. This limits throughput of the system by processor power. However, it would be desirable to implement the frame relay and cell relay in hardware without limiting the frame or cell relay system to specific applications. As the frame relay and cell relay standards do not specify a data rate, a hardware solution could be utilized in virtually any communication environment to handle frame relay and cell relay requirements from user terminal rates to optical-fiber network rates (up to 2.4 Gbps).

DISCLOSURE OF THE INVENTION

One advantage of the invention is in providing a system that implements frame relay and cell relay protocols in hardware.

Another advantage of the invention is in providing a frame or cell relay network that can handle frame or cell relay requirements in a wide range of data rates.

A further advantage of the invention is in providing modular frame or cell relay switching architecture to address a wide range of networking solutions with a few exchangeable modules.

The above and other advantages of the invention are achieved, at least, in part, by providing a communication system for transferring information between a plurality of transmitting and receiving data terminals. The system consists of receiving interface means responsive to the transmitting data terminals that form data packets having address and check fields. Translation memory means stores preset address and control information, which is used by receiving data management means to process the data packets. Buffer means responsive to the receiving data management means stores the data packet written by the receiving data management means. Transmitting data management means responsive to the receiving data management means read the data packets from the buffer means. Transmitting interface means responsive to the transmitting data management means convert the data packets into data transmitted to the receiving data terminals.

In accordance with a preferred embodiment of the invention, a buffer manager responsive to the receiving data management means allocates buffer cells of the buffer means for the data packets written by the receiving data management means and releases the allocated buffer cells in response to a releasing signal from the transmitting data management means when the corresponding data are transmitted to the receiving data terminals. Receiving data managers of the receiving data management means access the buffer manager in accordance with their priority. The buffer manager maintains a list of the buffer cells available for the receiving data management means. Separate write arbitration and read arbitration means may provide the receiving and transmitting data management means, respectively, with access to the buffer means. Transmitting data management means may access said buffer cells through switching means.

In accordance with one aspect of the invention, control and maintenance processing means responsive to the receiving data management means update the address and control information in the translation memory means and provide the receiving and transmitting interface means with control and maintenance information in real time. Also, the control and maintenance processing means may provide the receiving interface means with the address fields of the data packets. The receiving data management means may translate the address fields of the data frames in accordance with the updatable address and control information from the translation memory means.

The data packets may comprise data frames of variable length or data cells of fixed length.

Preferably, the receiving and transmitting interface means comprise exchangeable modules corresponding to specific types of terminal devices. In accordance with another aspect of the invention, a frame relay network for transferring data between a plurality of transmitting and receiving end points, comprises:

a plurality of receiving line interface devices coupled to the transmitting ends for forming data frames having address fields and frame check fields, a plurality of receiving frame management circuits coupled to the receiving line interface devices for processing the address fields and checking the frame check fields to discard the data frame with an erroneous frame check field, a plurality of translation memories coupled to the receiving frame management circuits for providing them with address and control information to process the address fields, a frame buffer storage coupled to the receiving frame management circuits and having a plurality of buffer memories for storing the data frames transferred by the receiving frame management circuits, a plurality of transmitting frame management circuits coupled to the frame buffer storage for reading the data frames, a plurality of transmitting line interface devices coupled to the transmitting frame management circuits for transferring the data frames to the receiving end points, and a control and maintenance processing circuit for providing the receiving and transmitting line interface devices with control and maintenance information and for updating the address and control information in the translation memories in real time.

In the preferred embodiment, a frame buffer management circuit responsive to the receiving frame management circuits allocates the buffer memories to the receiving frame management circuits and releases the allocated buffer memories in response to the transmitting frame management circuits. A priority arbitration circuit may provide the receiving and transmitting frame management circuits with access to the frame buffer storage for allocating and releasing the frame buffer memories. The access to release the frame buffer memories may have a higher priority than the access to allocate frame buffer memories. Alternatively, the allocation and releasing operations may have equal priority.

Preferably, the receiving frame management circuits discard the data frames having a discard eligibility field set when the frame buffer storage approaches saturation. The transmitting frame management circuits notify the receiving end points corresponding to the addresses of the discarded data frames to start a congestion procedure.

In the preferred embodiment, a separate write arbitration circuit and read arbitration circuit provide the receiving frame management circuits and the transmitting frame management circuits, respectively, with access to the frame buffer storage. Alternatively, the frame buffer storage may have a frame buffer memory for each of the transmitting frame management circuits coupled to the frame buffer memories through a switching circuit. The transmitting frame management circuits read the data frames from the frame buffer storage in response to a command from the receiving frame management circuits.

In accordance with the method of this invention, the following steps are carried out:

forming by receiving interface circuits the data packets having address fields and check fields in response to data sent by the transmitting data terminals, processing by receiving data management circuits the address fields in response to preset information, checking by the receiving data management circuits the check fields to discard the data packets with erroneous check fields, writing the data packets with the processed address fields into a buffer storage, reading by transmitting data management circuits the data packets from the buffer storage in response to commands from the receiving data management circuits, and transmitting by transmitting interface circuits the data to the receiving data terminals in response to the read data packets.

The method preferably is practiced in the frame relay or cell relay environment.

In accordance with a further aspect of the invention the data packets of a required format having address fields are formed in response to a first control signal transferred from a control processing circuit in real time. The address fields of the data packets are translated in accordance with predetermined address fields stored in a translation memory. The data packets are buffered in a buffer memory and then are read to form data to be sent to the receiving end points in accordance with the translated address fields. The predetermined address fields in the translation memory are updated in response to a second control signal transferred from the control processing circuit in real time.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
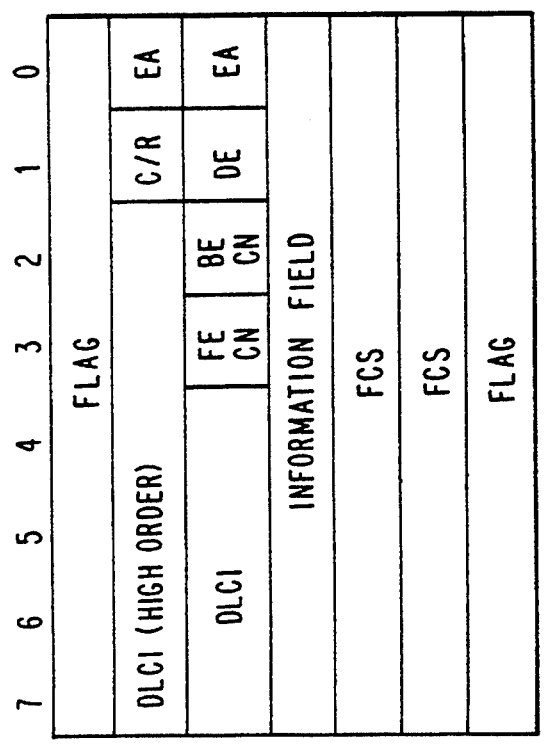
FIG. 1 is a diagram showing a frame format in a Frame Relay network.

Although the invention has general applicability in the field of data packet manipulation, the best mode for practicing the invention is based in part on the realization that the data packets transferred over the packet switching network have the frame relay HDLC format shown in FIG. 1. Accordingly, whereas the disclosure of this invention will be made in the field of frame relay, it is to be understood that the invention is not to be so limited.

Figure 2:
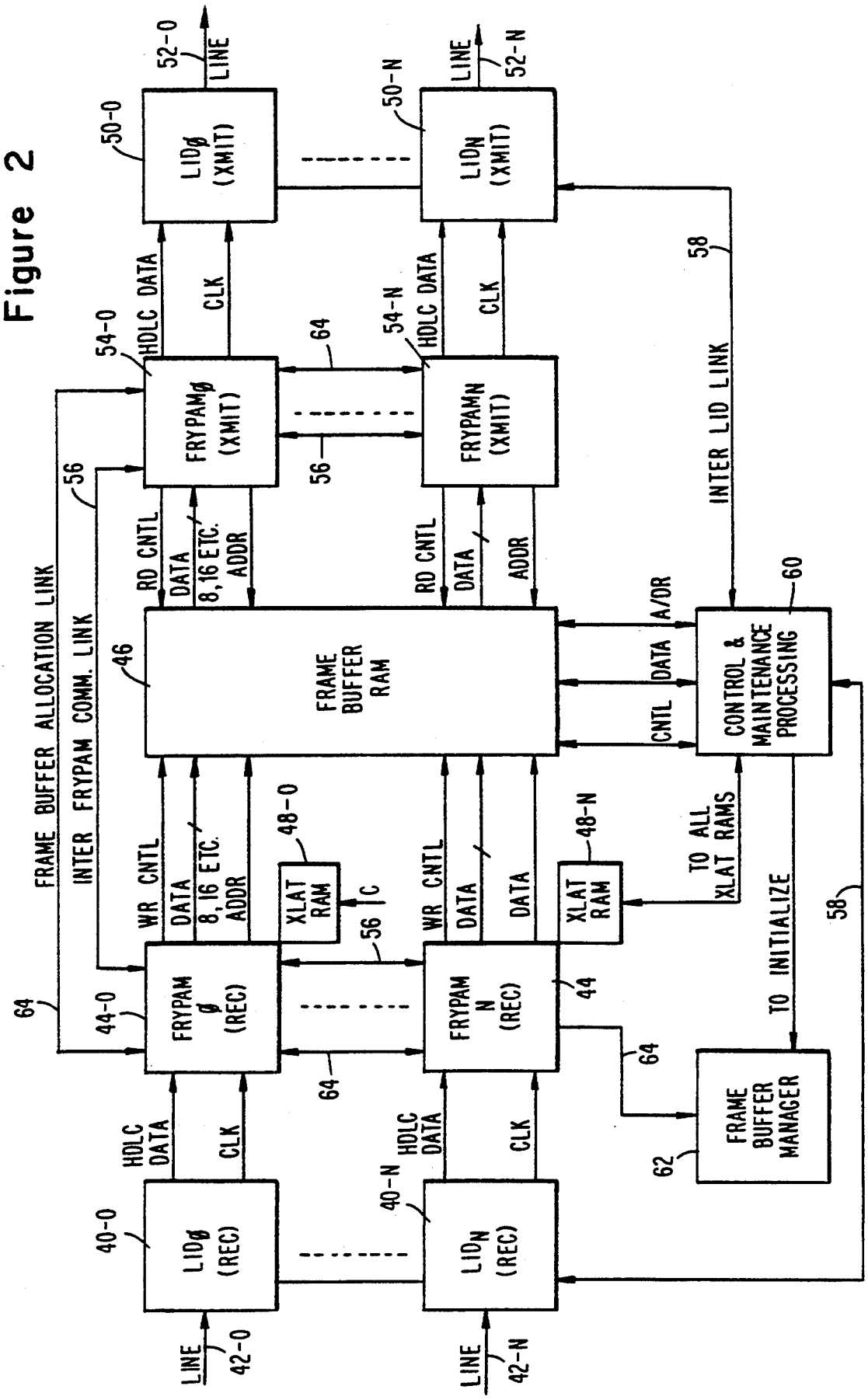
FIG. 2 is a diagram illustrating general architecture of a switching network in accordance with the present invention.

Referring to FIG. 2, in a frame relay network, line interface devices (LIDs) LID0–LIDn are coupled through input/output (I/O) communication lines to end devices. To make the disclosure more clear, FIG. 2 shows receiving and transmitting sections of the LIDs as separate blocks 40-0–40-N and 50-0–50-N, respectively, coupled to input communication lines 42-0–42-N and output communication lines 52-0–52-0. However, it is to be understood that LIDs 40 and 50 may be implemented as integral devices provided bi-directional line interface with an I/O communication bus. The LIDs may interface the network to a specific data terminal, for example, synchronous, asynchronous terminals or T1 line, by performing on the receive side the physical translation of information on the input lines to clock signal CLK and HDLC framed data having the format shown in FIG. 1. On the transmit side, the HDLC framed data and clock signal CLK are translated into the data appropriate for an end device. The type of the translation is specific to the line to be interfaced with. It may include some buffering capability to compensate for line jitter, transfer latency, etc. In the case of asynchronous data terminal, asynchronous to HDLC conversion must be performed. The synchronous data terminal may require time slot to HDLC conversion. To support cell relay switching, the LIDs perform cell assembly and disassembly in addition to the line interface functions.

Accordingly, the specific type of LID is required to support the specific end device. As the outputs of the LIDs provide uniform HDLC framed data and a clock, a general purpose modular switch may be provided by installing the appropriate LIDs for specific line interface requirements. This reduces the system cost by repeating the same FRYPAM hardware for each LID, regardless of the LID data rate. The structure of various specific LIDs is described in my copending application Ser. No. 08/236,853, entitled "Line Interface Device for Fast-Packet Network," filed May 2, 1994 and incorporated by reference.

The data frames transferred through the switching network are buffered in a frame buffer RAM 46 coupled to the LIDs through corresponding Frame Relay Packet Management devices (FRYPAM). The receiving FRYPAM sections 44-0–44-N provide management of the frame queue transmitted from the receiving LID sections 40-0–40-N, respectively. The transmitting FRYPAM sections 54-0–54-N transfer the frames read from the frame buffer RAM 46 to the transmitting LID sections 50-0–50-N, respectively.

As indicated above, an input to the receiving FRYPAM from the receiving LID comprises HDLC framed data and clock CLK. The FRYPAM checks the FCS field of the frame that may comprise a cyclic redundancy code (CRC). The frame is discarded, if its CRC has an error. Further, the FRYPAM extracts the 10-bit DLCI field of the received frame and uses this value as the address into a translation (XLAT) RAM 48 attached to each receiving FRYPAM.

Figure 3:
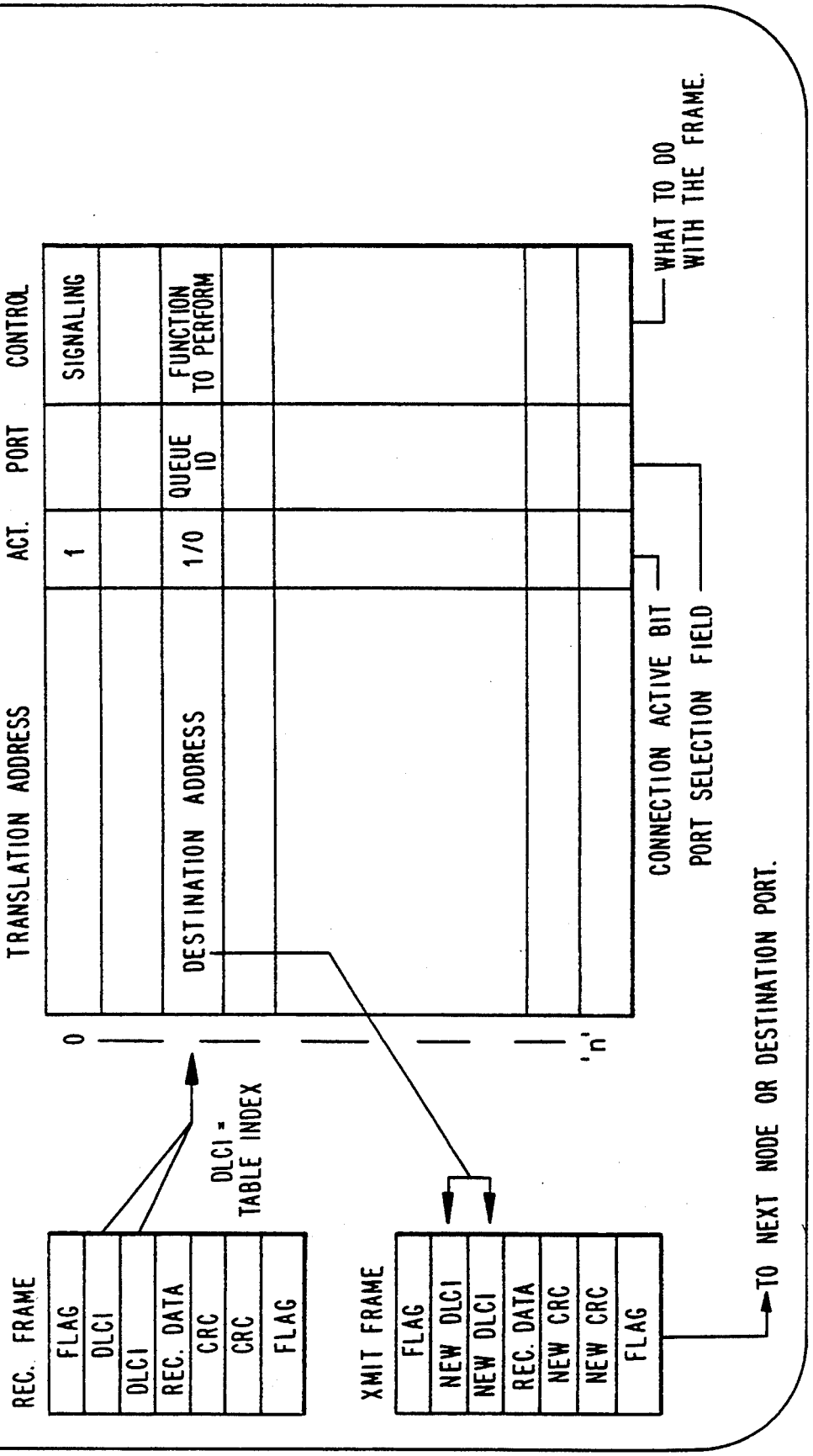
FIG. 3 shows a look-up table in an XLAT RAM.

Each of the translation RAMs 48-0–48-N respectively coupled to the FRYPAMs 44-0–44-N comprises a look-up table shown in FIG. 3. In accordance with the invention, the look-up table comprises a list of destination addresses, connection active bits, port selection fields and control field. As frames are received by the FRYPAM, the extracted DLCI address field provides an index into the translation RAM, providing access to a new destination address in the table. The new destination address stored is read from the translation RAM and replaces the address in the received frame. The same index is used to select the destination port and to determine additional functions to be performed with the received frame. If the connection active bit indicates that the DLCI is not active, the frame is discarded.

If the frame is to be relayed, its DLCI is replaced with the new destination address, and the receiving FRYPAM generates a write control signal WR CNTL and addressing signal ADDR to write the new address together with the remaining frame data in the location of the frame buffer RAM. When a complete frame has been stored in the frame buffer RAM, the receiving FRYPAM sends a packet availability message to the destination transmitting FRYPAM via inter FRYPAM communication link 56 that connects all of the transmitting and receiving FRYPAMs. The identification number of the destination FRYPAM is read from the look-up table in the translation RAM. The packet availability message comprises the address of the frame in the frame buffer RAM and byte counts indicating the length of the frame. The transmitting FRYPAM maintains a transmit queue for all frames it must transmit. It generates a read control signal RD CNTL and addressing signal ADDR to read the frames from the frame buffer RAM 46 and to send them to the corresponding transmitting LID 50 in the HDLC format (HDLC data) together with a clock signal CLK. The transmitting LIDs convert the HDLC data from the FRYPAMs to the format appropriate for the specific line interface. This information is then transmitted over the communication lines 52 to the receiving end device or data terminal. Like the LIDs, the FRYPAM receiving and transmitting sections may be implemented in an integral device. The frame processing procedure performed by the receiving and transmitting FRYPAMs and their structure is disclosed in more detail in my copending application Ser. No. 08/207,520, entitled "Packet Management Device for Fast-Packet Network," filed Mar. 8, 1994 and incorporated by reference.

If the look-up table in the translation RAM indicates that the received frame carries control or maintenance information, the transmission FRYPAM sends this frame to a control and maintenance processor 60 that handles control and maintenance operations in the switching network. The processor 60 uses the control and maintenance frames to update the contents of the translation RAMs in real time as virtual connections are altered. It may also perform call processing functions to support switched services and respond to or initiate maintenance operations, for example, loopbacks, error counts, throughout the network. Furthermore, the control and maintenance processor 60 communicates DLCI and line interface parameters to LIDs via an inter LID link 58 that connects all of the LIDs to each other and to the processor 60. The structure and operations of the control and maintenance processor will be disclosed in more detail later.

As indicated above, the receiving FRYPAMs write the received frames into the frame buffer RAM 46. With multiple FRYPAMs writing into a common frame buffer RAM having a plurality of frame buffers, a frame buffer manager 62 that maintains a dynamic list of available frame buffers of the RAM provides allocation of the frame buffers for the receiving FRYPAM operations. The communication between the FRYPAMs and the frame buffer manager occurs over a frame buffer allocation link 64 that connects all of the FRYPAMs to each other and to the frame buffer manager 62. Over this link, the transmitting FRYPAMs send deallocating signals that cause the frame buffer manager to release the allocated buffers when the data has been transmitted on the line. The frame buffer continuously tries to maintain buffers for all receiving FRYPAMs. If no buffers are available, the received frame is discarded. All frames are allocated the same amount of space in the frame buffer RAM. This space may be large enough to buffer the largest frame available on the network (typically 4K bytes). As shown in more detail later, the allocation may be preformed by hardware.

Since the buffer allocation size for each frame is fixed, it is possible to allocate 56 byte frames in the frame buffer RAM to support cell relay switching. In this case, the LIDs may perform cell assembly and disassembly in addition to the line interface functions. Further, LIDs may extract the addressing information from the cell header and transform this data into an HDLC formatted fixed length frame. As a result, the FRYPAM operations are performed in the same way as for the frame relay switching.

Figure 4:
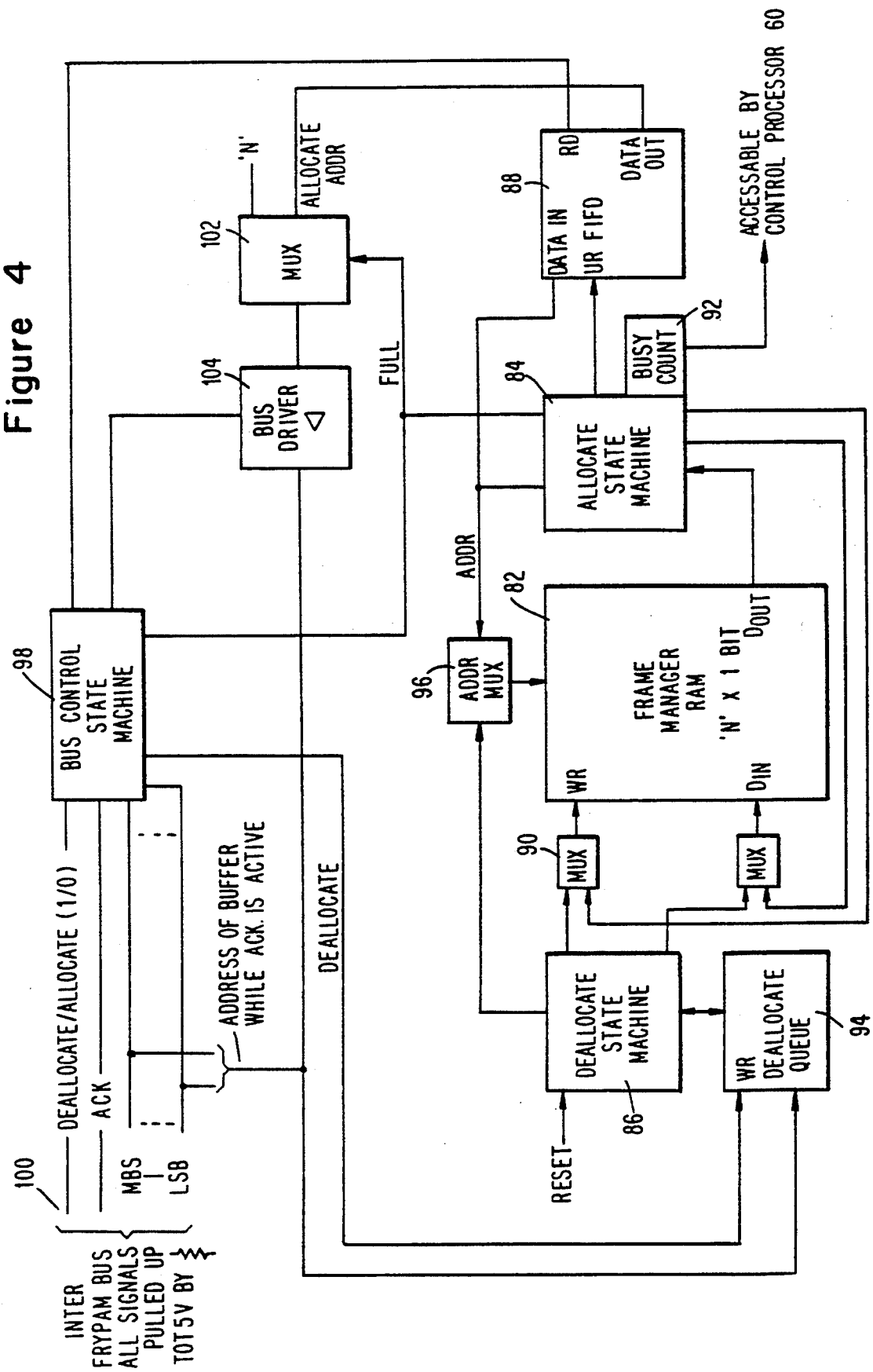
FIG. 4 is a diagram of the frame buffer manager shown in FIG. 2.

Referring to FIG. 4, the frame buffer manager 62 comprises a frame manager RAM 82 that maintains a list of active frame buffers in the frame buffer RAM 46. One bit in the manager RAM 82 corresponds to one frame buffer in the frame buffer RAM 46. The addresses of the manager RAM bits are arranged linearly to the frame buffer RAM. The first bit in the manager RAM (at address 0) holds the free/empty status for the first frame buffer in the frame buffer RAM. The second bit (at address 1) contains the status of the second frame buffer. For n bits, bit address n−1 contains the status of the frame buffer n. The total number of bits in the frame manager RAM is equal to the total number of bytes in the frame buffer RAM divided by the number of bytes allocated per frame.

After power up or a reset condition, the frame manager RAM contents may be cleared. Assume a cleared bit (0) means that the frame buffer is free, and a bit 1 indicates that the buffer is in use. An allocation state machine 84 and deallocation state machine 86 are used to manipulate the frame manager RAM 82. The allocation state machine scans the manager RAM for free buffers (0 values), and stores the addresses of the free buffers in a FIFO memory 88. When a free buffer is found, allocation state machine 84 sets the corresponding bit in the frame manager RAM 82 over its WR input accessible through a multiplexer 90. Accordingly, if a bit is found to be 0, it is set to 1. When the FIFO 88 is full, the state machine freezes at the last stored RAM address incremented by one, and continues with the next location when the FIFO has room available. When the entire RAM has been scanned (n bits read), the state machine restarts at the address 0.

If during the entire scan of n bits, no 0 values are found, the frame buffer RAM is determined to be full. If this condition remains until the FIFO is empty, any additional requests for buffer space will be rejected. This may be accomplished by issuing a frame buffer address that is not less than n (">=n"). This out of bounds address, or any predetermined special address may be used to inform a FRYPAM that no buffer space is available. While scanning the manager RAM, the number of allocated frames is counted. This is useful in determining buffer utilization over time and detection of congestion before the frame buffer RAM reaches saturation. The count corresponding to the number of busy buffers found during the scan is latched into a busy count register 92 accessible by the control and maintenance processor 60.

When the FIFO 88 is full, or no buffers are free, the deallocation state machine 86 clears the frame manager RAM bits corresponding to frame buffers that have been released by the transmitting FRYPAMs. The deallocation state machine monitors a deallocation queue register 94 that stores a deallocation queue formed by the transmitting FRYPAMs. The deallocation state machine writes a 0 value into the frame manager RAM address corresponding to the released frame buffer indicated in the deallocation queue. An address multiplexer 96 supplies the frame manager RAM 82 with addressing signals generated by allocation and deallocation state machines.

The operating speed of the allocation and deallocation state machines is high enough and the capacity of the FIFO and deallocation queue register is large enough to handle requests from all FRYPAMs without delaying access to a frame buffer or causing the deallocation queue to overflow. The frame manager RAM may be implemented as a dual port RAM allowing simultaneous access from both state machines. An arbitration scheme may also be implemented to regulate access from each state machine based on such conditions as current FIFO depth and deallocation queue depth. Alternatively, a round robin equal access scheme may be implemented.

Figure 5:
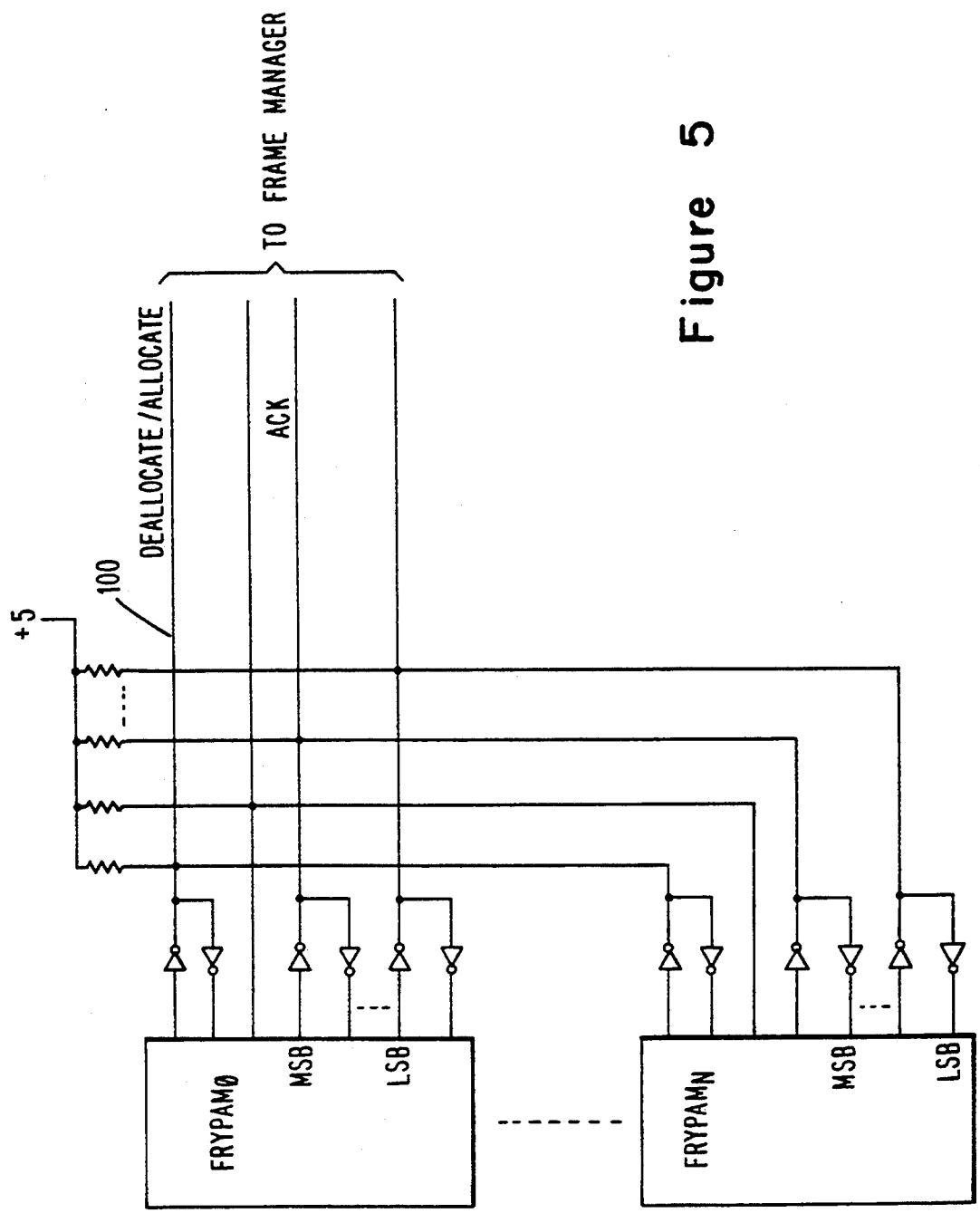
FIG. 5 is a circuit diagram showing an example of the frame buffer allocation link shown in FIG. 2.

As indicated above, the communication between the FRYPAMs and the frame buffer manager occurs over the frame buffer allocation link 64 coupled to a bus control state machine 98 that controls interaction between the FRYPAMS and the frame buffer manager. The bus control state machine 98 is connected to an inter FRYPAM bus 100 of the frame buffer allocation link that may be implemented for example with a priority arbitration parallel circuit shown in FIG. 5. The receiving and transmitting FRYPAMS 0 to N are connected in parallel to the multiline bus 100 that is terminated to the logic one state via pull-up resistors. The bus line Deallocate/Allocate corresponding to the highest order bit is used to select allocate or deallocate function. An acknowledge line ACK is used to perform the data transfer and to indicate that the bus is busy. The remaining lines coupled to the address outputs MSB to LSB of the FRYPAMs allows the FRYPAMs to present its address. The actual FRYPAM address is complemented and driven on the bus via open collector type drivers.

The driving FRYPAM monitors the bus and attempts to verify that its address supplied on the bus is correct. If so, it continues to drive the bus until the frame buffer manager sends an acknowledge over the line ACK. For an allocate operation, the requesting FRYPAM releases its address when the acknowledge signal becomes active, and the frame buffer manager drives the bus with the frame buffer address read from the FIFO 88. The acknowledge signal then goes inactive and the bus is released. The FRYPAM accepts the frame buffer address on the trailing edge of the acknowledge signal. To provide deallocation, the requesting FRYPAM drives the frame buffer address on the bus during the time that the acknowledge signal is active. The frame buffer manager stores the address in the deallocation queue register 94 and releases the acknowledge signal.

No FRYPAM may access the bus when the address field is not all high or when the acknowledge signal is active. To provide access when multiple FRYPAMs apply their address to the bus at the same time, the arbitration mechanism allows only one FRYPAM address to remain on the bus while the others back off. This may be done by having each FRYPAM compare its address to the address on the bus, from the most significant to least significant bit. During the comparison, if the bus bit does not equal to the driving bit, the driving FRYPAM releases its request from the bus. This mechanism provides a priority arbitration since the higher addressed FRYPAMs will always override the lower addressed FRYPAMs when multiple FRYPAMs are trying to access the bus simultaneously.

To prevent the frame buffer from being saturated, deallocation operations may have a higher priority then allocation operations. Alternatively, allocation and deallocation may have equal priority.

In the disclosed example, bus address arbitration and data transfer are performed asynchronously. Alternatively, a synchronous scheme may be implemented so as to provide the arbitration and data transfer phases on alternating edges of the clock supplied on the bus. For example, the address arbitration may occur while the clock is high, and the data transfer may be performed while the clock is low. On the falling edge of the clock, the FRYPAMs may determine who has won the arbitration. Then, the winning FRYPAM may drive the bus for a deallocation operation. For allocation, the frame buffer manager may drive the bus on the falling edge of the clock. Data may be latched on the rising edge of the clock. Then, the bus is released. Accordingly, it is to be understood that the arbitration mechanism may be implemented in numerous ways so as to provide fast allocation and deallocation operations with minimal bus contention.

As mentioned previously, the bus control state machine 98 (FIG. 4) is used to control access between the FRYPAMs and the frame buffer manager via the inter FRYPAM bus 100. The operation of the bus control state machine is as follows. If the bus is idle, the state machine 98 sets state 0. If an allocation operation is requested, state 1 is set. If other conditions occur, state 2 is set.

In state 1 (request for allocation), when the address arbitration is settled, the state machine activates the acknowledge signal in line ACK. If the FIFO 88 is not empty, the state machine reads the FIFO and drives the corresponding address from the FIFO onto the bus through a multiplexer 102 and bus driver 104. If the FIFO is empty, the request for buffer space is rejected by driving onto the bus the frame buffer address ">=n" described previously. This address is supplied through an additional input "n" of the multiplexer 102. Then, the state machine waits for bus to settle, releases the acknowledge signal and sets the state 0.

In state 2 (request for deallocation), the state machine 98 waits for address arbitration to settle and activates the acknowledge signal in line ACK. The address received in response from a transmitting FRYPAM is stored in the deallocation queue register 94. Then the acknowledge signal is released and the state 0 is set to wait for a next request.

Figure 6:
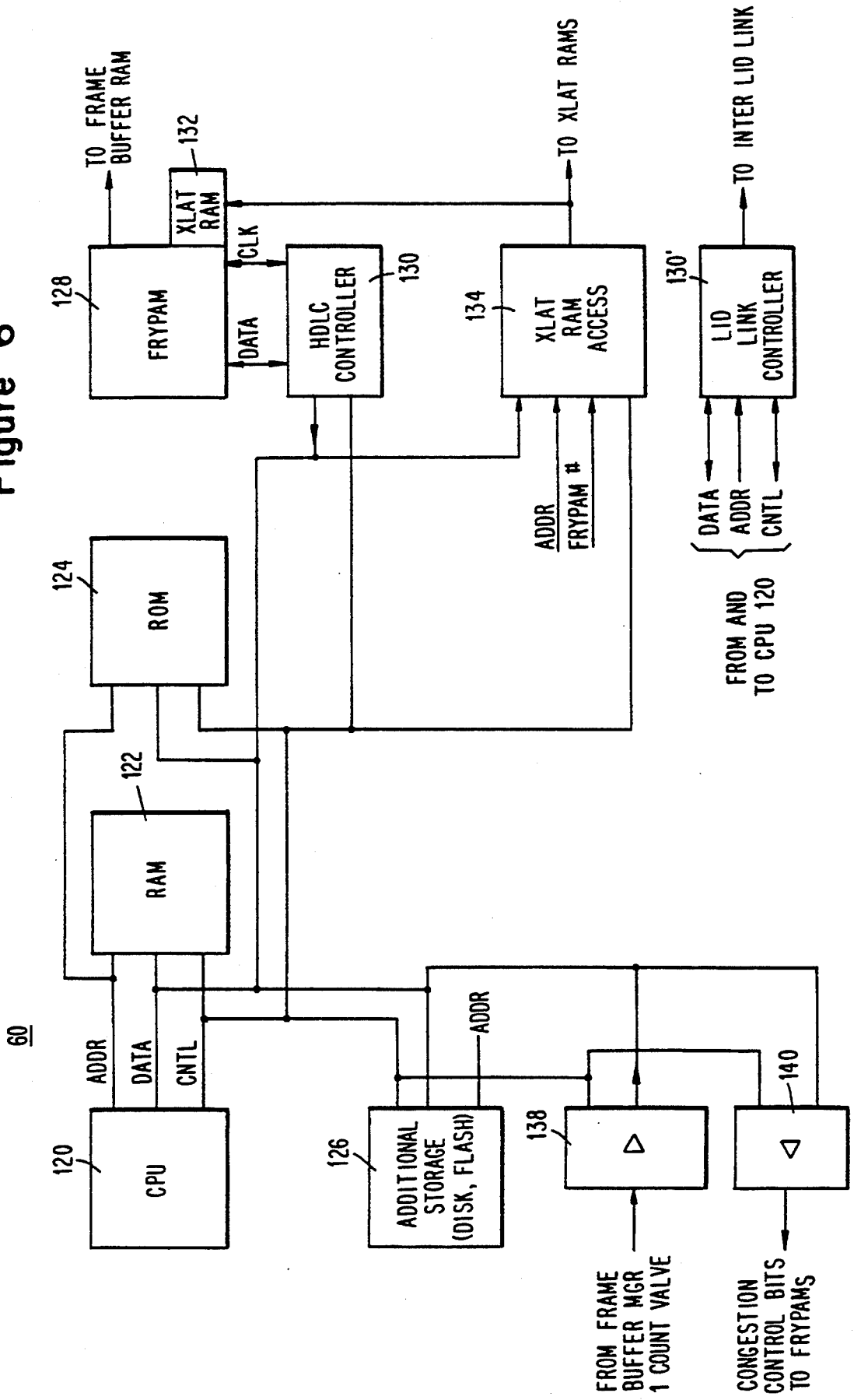
FIG. 6 is a diagram of the control and maintenance processor shown in FIG. 2.

Reference is now made to FIG. 6 of the drawings showing an exemplary diagram of the control and maintenance processor 60 that has access to the frame buffer manager, frame buffer RAM and all FRYPAMs and LIDs in the system. The processor comprises a CPU 120 coupled to a RAM 122 for temporary data storage and ROM 124 for program storage. Numerous 16 or 32 bit CISC and RISC processors can be used as the CPU 120 to process all control and maintenance frames from every FRYPAM and update the contents of the translation RAMs in real time. Although the ROM 124 is usually used for storing the program code, the program may be loaded to the RAM 122 from an additional storage 126 such as a hard disk or FLASH PROMs. In addition, the ROM area may contain FLASH PROMs, battery backed up SRAM or other non-volatile memories.

A FRYPAM 128 and HDLC controller 130 are used to access the frame buffer RAM. This hardware combination provides the CPU with direct frame access to the frame buffer RAM. A modified FRYPAM that just handles the frame buffer access and buffering may be used as the FRYPAM 128. Alternatively, the basic FRYPAM similar to the FRYPAMs 44 and 54, may be used to eliminate the cost of developing a specific unit. Regardless of the implementation, the CPU reads frames into its RAM from the FRYPAM transmit operation to the HDLC controller receiver. The FRYPAM also handles frame buffer deallocation when the frame is sent to the HDLC controller. The CPU may queue frames for transmission by transmitting HDLC data to the FRYPAM through the HDLC controller 130. A translation RAM 132 attached to the FRYPAM 128 and storing the translation look-up table shown in FIG. 3, may be used to translate the DLCI fields of the frames transmitted by the CPU to the destination DLCI. The updated frames are stored in the frame buffer RAM after the buffer allocation operation is performed. The transmit queue information is sent to the destination FRYPAM. The frame buffer access work is performed by the FRYPAM 128.

A translation (XLAT) RAM access circuit 134 provides the CPU with access to all XLAT RAMs in the system. This may be accomplished by a parallel bus connecting all of the XLAT RAMs to each other and to the XLATRAM 132. Bus transceivers may be provided to perform data transfer on this bus. In addition to the CPU data, the access circuit 134 receives the identification number of the FRYPAM to be accessed and the required address of the corresponding XLAT RAM to provide the CPU with ability to read and write data from or to every location in every XLAT RAM. An arbitration mechanism is provided to prevent the CPU from accessing the XLAT RAM when the FRYPAM attached to the corresponding XLAT RAM reads the XLAT RAM data. For example, a ready signal from the XLATRAM indicating that the FRYPAM is not accessing its XLAT RAM may be used to enable the CPU access. If the ready signal is not active, the CPU waits for the FRYPAM access to be completed.

As mentioned previously, all LIDs in the system are connected via inter LID link 58 coupled to the control and maintenance processor 60 to allow DLCI, link interface and maintenance information to be transferred between the processor and the LIDs. This link may be implemented via numerous serial or parallel bus architectures including master-slave polling, multimaster HDLC, token passing and CSMA/CD. Any of these approaches that can provide transferring control and maintenance information to all LIDs in real time, may be used as the inter LID link of the present invention. The CPU 120 accesses the inter LID link via a LID link controller 136 to transfer DLCI information stored in the RAM 122 and to request loopback operations and other relevant control and maintenance procedures. In a master-slave implementation, the LID link controller 136 always performs the master functions.

In accordance with the invention, the CPU 120 also has access to the count corresponding to the number of busy buffers of the frame manager RAM updatable by the frame buffer manager 62 each time the allocate state machine completes a scan over the frame manager RAM. The count value from the frame buffer manager 62 is transferred to the CPU 120 via a buffer 138, allowing the CPU to monitor the amount of frame buffer utilization in real time. When the frame buffer RAM approaches saturation, the CPU sends via a buffer 140 congestion control bits to the FRYPAMs to allow the receiving FRYPAMs to discard frames that have the Discard Eligibility bit set. The corresponding transmitting FRYPAMs may set the FECN bit to notify the destination end device that congestion management procedure should be started. The specifics of the congestion management procedure are described in the relevant Frame relay standards. Inasmuch as the CPU has access to the frame buffer utilization in real time, and the FRYPAMs have ability to discard eligible receive frames and set congestion bits in the transmit frames, numerous congestion management schemes may be implemented in accordance with the present invention. For example, no congestion bits in the frame relay header, or only the Discard Eligibility bits may be used. Some of the implementations may use every available congestion avoidance procedure.

Figure 7:
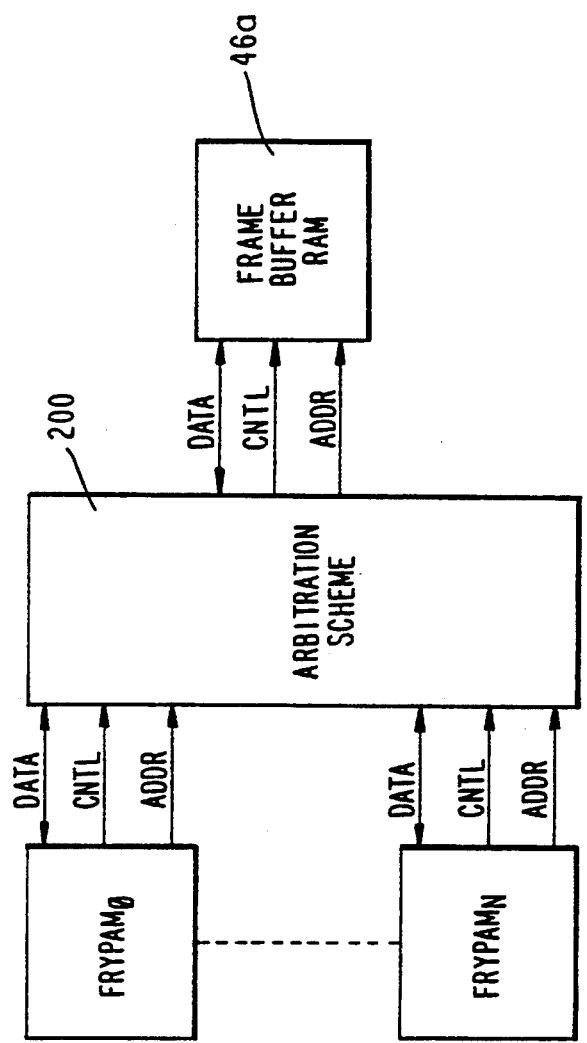
FIG. 7 is an example of the frame buffer RAM access scheme, wherein a common frame buffer RAM is shared by all FRYPAMs.

As shown in FIG. 7, in accordance with one aspect of the invention, a common frame buffer RAM 46a is shared by all receiving and transmitting FRYPAMs 0 to N in the system. All receive frames are written to the RAM by receiving FRYPAMs, and all transmit frames are read form the RAM by transmitting FRYPAMs. The FRYPAMs generate control CNTL and addressing ADDR signals to provide data writing and reading. As mentioned previously, the frame buffer RAM is at least 32 bits wide to make each access to the frame buffer RAM more efficient. As the RAM capacity may be not sufficient to provide all of the FRYPAMs connected to high speed LIDs with simultaneous access to the RAM, an arbitration circuit 200 is used to perform arbitration functions. For example, a round robin arbitration scheme may be used to provide every FRYPAM with an equal chance to access the frame buffer RAM. In this case, the time required to gain access to the RAM is equal to the arbitration latency time plus the RAM access time. The arbitration latency time increases linearly with the number of FRYPAMs connected to the RAM. However, as the access time is limited by the speed of the RAM, this approach may eventually cause the frame buffer RAM to be a bottleneck in the system when many high speed lines are being switched.

Figure 8:
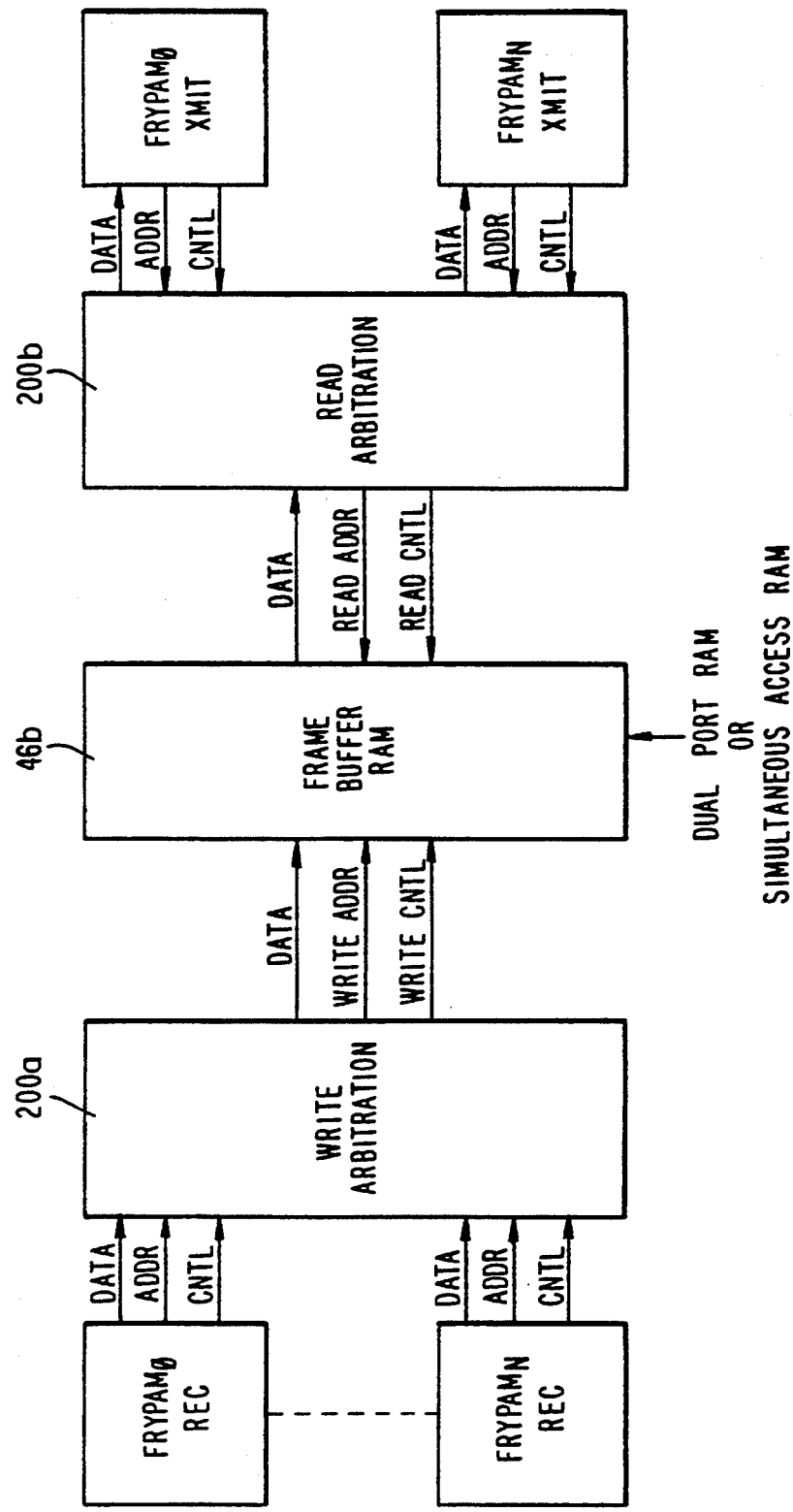
FIG. 8 is an example of the frame buffer RAM access scheme, wherein a dual port RAM or simultaneous access RAM is used to provide separate access of receiving and transmitting FRYPAMs.

FIG. 8 represents another example of the frame buffer RAM access scheme that involves a dual port frame buffer RAM or simultaneous access RAM 46b. This approach allows the receiving and transmitting FRYPAMs 0 to N to access the writing and reading ports of the frame buffer RAM for data writing and reading, respectively, at the same time. As the frame must be completely stored in the RAM before the transmitting FRYPAM knows that the frame exists, the architecture in FIG. 8 guarantees that read and write accesses to each frame buffer of the RAM will never occur simultaneously. This eliminates any RAM contention due to read and write operations occurring simultaneously at the same address. Accordingly, this frame buffer implementation provides at least a two-fold increase in frame access performance. Separate write and read arbitration circuits 200a and 200b are used to arbitrate contention between the receiving FRYPAMs and between the transmitting FRYPAMs, respectively. This decreases the arbitration time latency by half in compare with the circuit in FIG. 7.

Figure 9:
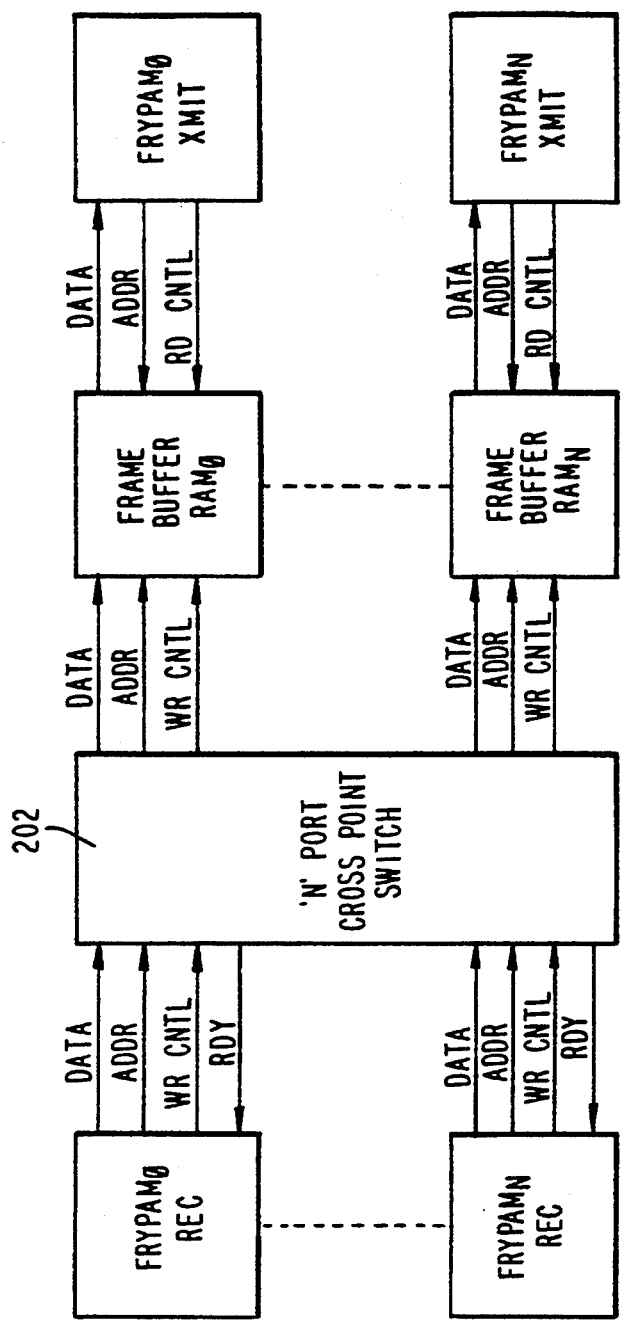
FIG. 9 is an example of the frame buffer RAM access scheme, wherein a separate frame buffer RAM is provided for each FRYPAM.

FIG. 9 shows a further example of the frame buffer RAM access scheme, wherein a separate frame buffer RAM 0 to N is provided for each of the FRYPAMs 0 to N. Each frame buffer RAM contains the transmit data for the corresponding FRYPAM. As frames are received, the receiving FRYPAM requests a path to the destination FRYPAM through a crosspoint switch 202. If the destination FRYPAM can be accessed at that time, the crosspoint switch sends a ready signal RDY to the receiving FRYPAM to provide data writing in the frame buffer RAM corresponding to the destination FRYPAM. If the destination frame buffer RAM is busy (being accessed by another receiving FRYPAM), the crosspoint switch issues a not ready condition to the requesting FRYPAM. In this case, the FRYPAMs need to have the buffer capacity large enough to accumulate data when the destination frame buffer RAM is busy. This approach eliminates any arbitration and access delays in the transmitting path.

Further, all control and maintenance frames received by the receiving FRYPAMs may be routed to a separate control and maintenance buffer RAM directly accessible by the control and maintenance processor. This eliminates the need for the FRYPAM 128 and HDLC controller 130 in the control and maintenance processor. If the control and maintenance frames need to be transmitted, the control and maintenance processor may provide their transmission to the destination FRY-PAMs.

There accordingly has been described a modular architecture for fast-packet networks that comprises line interface devices (LIDs) exchangeable to support numerous line interfaces. The LIDs supply frame relay packet management devices (FRYPAMs) with unified framed data in HDLC format and clock signals. The receiving FRYPAMs perform CRC checking, check look-up tables to convert the DLCI fields if needed, writes the received frames with correct FCS fields into a frame buffer RAM and communicates with other FRYPAMs to update transmission queues. The transmitting FRYPAMs read the frames from the frame buffer RAM and send them to the transmitting LIDs coupled to destination end points. The transmitting LIDs convert the HDLC data from the FRYPAMs to the format appropriate for the specific line interface and transmit the information to the destination end points. A frame buffer manager allocates available frame buffers in the frame buffer RAM among the FRYPAMs. If no buffers are available, the received frame is discarded. A control and maintenance processor handles control and maintenance operations for the fast-packet network. It updates the look-up tables in real time as virtual connections are altered. Also, it communicates DLCI and line interface parameters to the LIDs.

Accordingly, the disclosed architecture provides handling fast-packet protocols in hardware and addresses a wide range of networking solutions with a few exchangeable modules.

In this disclosure, there are shown and described only the preferred embodiments of the invention, but it is to be understood that the invention is capable of changes and modifications within the scope of the inventive concept as expressed herein.

I claim:

1. A communication system for transferring information between a plurality of transmitting data terminals and receiving data terminals, comprising:
    receiving interface means responsive to said transmitting data terminals for forming data packets having address and check fields,
    translation memory means for storing preset address and control information,
    receiving data management means responsive to said receiving interface means for processing the data packets based on the preset address and control information from said translation memory means and checking the check fields,
    buffer means responsive to said receiving data management means for storing the data packet written by said receiving data management means,
    transmitting data management means responsive to said receiving data management means for reading the data packets from said buffer means, and
    transmitting interface means responsive to said transmitting data management means for converting the data packets into data transmitted to said receiving data terminals.

2. The system of claim 1 further comprising:
    a buffer manager responsive to said receiving data management means for allocating buffer cells of said buffer means to the data packets written by said receiving data management means.

3. The system of claim 2, wherein receiving data managers of said receiving data management means access said buffer manager in accordance with their priority.

4. The system of claim 2, wherein said buffer manager maintains a list of the buffer cells available for said receiving data management means.

5. The system of claim 2, wherein said buffer manager releases the allocated buffer cells in response to a releasing signal from said transmitting data management means when the corresponding data are transmitted to said receiving data terminals.

6. The system of claim 1, wherein separate write arbitration and read arbitration means provide said receiving and transmitting data management means, respectively, with access to said buffer means.

7. The system of claim 1, wherein switching means provide said transmitting data management means with access to said buffer means.

8. The system of claim 1 further comprising control and maintenance processing means responsive to said receiving data management means for updating the address and control information in said translation memory means.

9. The system of claim 8, wherein said control and maintenance processing means provide said receiving and transmitting interface means with control and maintenance information in real time.

10. The system of claim 8, wherein said control and maintenance processing means provide said receiving interface means with the address fields of the data packets.

11. The system of claim 1, wherein said receiving data management means update the address fields of the data frames in accordance with the address and control information from said translation memory means.

12. The system of claim 1, wherein said data packets comprise data frames of variable length.

13. The system of claim 1, wherein said data packets comprise data cells of fixed length.

14. The system of claim 13, wherein said receiving interface means perform cell assembly and said transmitting interface means perform cell disassembly.

15. The system of claim 1, wherein said receiving and transmitting interface means comprise exchangeable modules corresponding to specific types of said terminals.

16. A frame relay network for transferring data between a plurality of transmitting and receiving end points, comprising:
    a plurality of receiving line interface devices coupled to said transmitting end points for forming data frames having address fields and frame check fields,
    a plurality of receiving frame management circuits coupled to said receiving line interface devices for processing the address fields and checking the frame check fields to discard the data frame with an erroneous frame check field,
    a plurality of translation memories coupled to said receiving frame management circuits for providing them with address and control information to process the address fields,
    a frame buffer storage coupled to said receiving frame management circuits and having a plurality of buffer memories for storing the data frames transferred by said receiving frame management circuits, a plurality of transmitting frame management circuits coupled to said frame buffer storage for reading the data frames, a plurality of transmitting line interface devices coupled to said transmitting frame management circuits for transferring the data frames to said receiving end points, and a control and maintenance processing circuit for providing said receiving and transmitting line interface devices with control and maintenance information and for updating the address and control information in said translation memories in real time.

17. The network of claim 16, further comprising a frame buffer management circuit responsive to said receiving frame management circuits for allocating said buffer memories to said receiving frame management circuits.

18. The network of claim 17, wherein said frame buffer management circuit releases the allocated buffer memories in response to said transmitting frame management circuits.

19. The network of claim 16, wherein a priority arbitration circuit provides said receiving and transmitting frame management circuits with access to said frame buffer storage for allocating and releasing said buffer memories.

20. The network of claim 19, wherein the access to release said frame buffer memories has a higher priority than the access to allocate said frame buffer memories.

21. The network of claim 16, wherein said receiving frame management circuits discard the data frames having a discard eligibility field set when said frame buffer storage approaches a programmable level of saturation.

22. The network of claim 21, wherein said transmitting frame management circuits notify said receiving end points corresponding to the addresses of the discarded data frames to start a congestion procedure.

23. The network of claim 16, wherein separate write arbitration circuit and read arbitration circuit provide said receiving frame management circuits and said transmitting frame management circuits, respectively, with access to said frame buffer storage.

24. The network of claim 16, wherein said frame buffer storage has a frame buffer memory for each of said transmitting frame management circuits.

25. The network of claim 16, wherein said transmitting frame management circuits are coupled to said frame buffer memories through a switching circuit.

26. The network of claim 16, wherein said transmitting frame management circuits read the data frames from said frame buffer storage in response to a command from said receiving frame management circuits.

27. A method of transferring data packets between a plurality of transmitting and receiving end points of a telecommunications network, comprising the steps of:

interfacing the transmitting end points with the network to form the data packets of a required format having address fields in response to a first control signal transferred from a control processing circuit in a real time, storing of predetermined address fields of the data packets in a translation memory, translating the address fields of the formed data packets in accordance with the predetermined address fields, buffering the data packets in a buffer memory, reading the data packets from the buffer memory to form data to be sent to the receiving end points in accordance with the translated address fields, and updating the predetermined address fields in the translation memory in response to a second control signal transferred from the control processing circuit in real time.

* * * * *